(Model.)

L. B. SMITH.
HOSE PIPE NOZZLE.

No. 245,096.  Patented Aug. 2, 1881.

Witnesses.

Inventor.
Lyman B. Smith
Per C. C. Shaw,
Atty.

United States Patent Office.

LYMAN B. SMITH, OF CHELSEA, MASSACHUSETTS.

HOSE-PIPE NOZZLE.

SPECIFICATION forming part of Letters Patent No. 245,096, dated August 2, 1881.

Application filed May 18, 1881. (Model.)

*To all whom it may concern:*

Be it known that I, LYMAN B. SMITH, of Chelsea, in the county of Suffolk, State of Massachusetts, have invented a certain new and useful Improvement in Hose-Pipe Nozzles, of which the following is a description sufficiently full, clear, and exact to enable any person skilled in the art or science to which my invention appertains to make and use the same, reference being had to the accompanying drawings, forming a part of this specification, in which—

Figure 1:
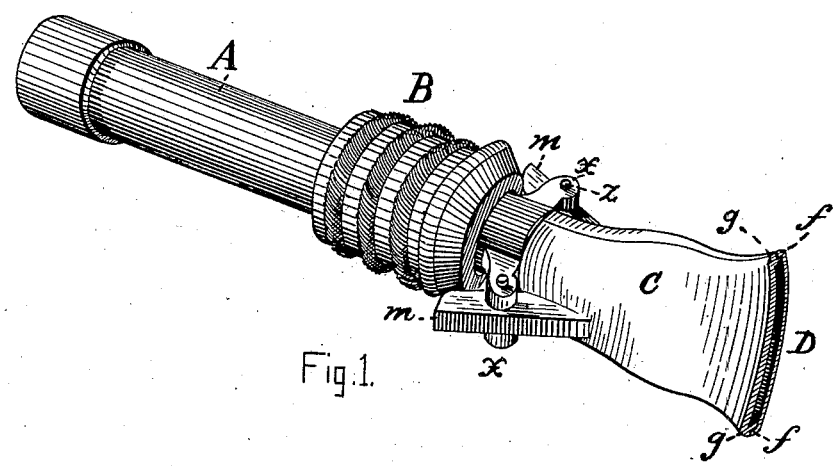
Figure 2:
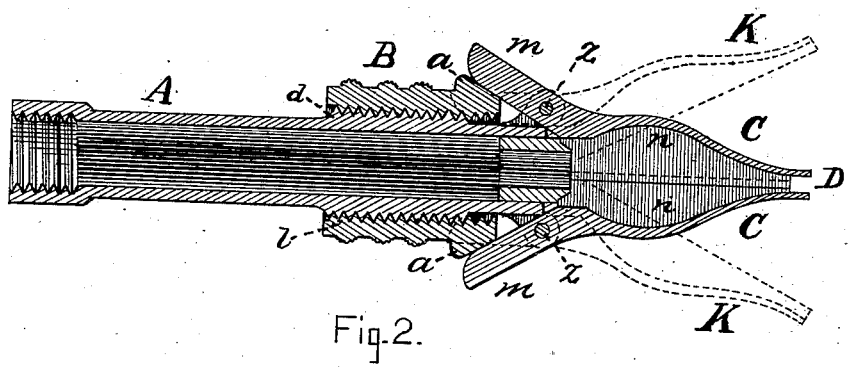

Figure 1 is an isometrical perspective view, and Fig. 2 a vertical longitudinal section.

Like letters of reference indicate corresponding parts in the different figures of the drawings.

My invention relates more especially to that class of hose-pipe nozzles which are provided with means whereby they may be readily altered or adjusted to produce a change or variation in the form of stream thrown; and it consists in a novel construction and arrangement of the parts, as hereinafter more fully set forth and claimed.

In the drawings, A represents the body of the nozzle, B the nut, and C the lips or mouth-piece.

The body A is tubular in form, and a section, $d$, of the same is exteriorly threaded to receive the nut B, which is provided with a corresponding interior screw-thread, $l$.

Projecting from the outer end of the body A, on opposite sides of the same, are two slotted studs, $x\ x$, in which the lips C are hinged or jointed by means of the arms $m\ m$ and pins $z\ z$. These lips are flattened at their outer ends, and when closed, as seen in Fig. 1, form a mouth-piece having an elongated narrow opening, D, for producing a flat or thin, wide stream.

One of the lips C has its longitudinal edges flanged or turned inwardly at right angles, as seen at $f$, these flanges fitting into corresponding rabbets $g$ formed along the sides of the opposite lip, so that when the lips are closed for use, as shown in Fig. 1, comparatively water-tight joints are formed at their lateral edges.

The bodies of the lips C are bent outwardly or concaved, as seen at $n\ n$, Fig. 2, forming an enlargement or chamber in the mouth-piece which serves to prevent any undue back pressure when a change is made from a round to a flat stream.

The arms $m\ m$ are extended back beyond the points at which they are jointed to the studs $x$, so that when the nut B is turned toward the outer end of the body A its conical end $a$ passes under the free ends of the arms, and operates to close the lips in a manner which will be readily understood by all conversant with such matters without a more explicit description.

In the use of my improvement, when a round stream is desired, the nut B is turned back on the body A, permitting the lips C to assume the position shown by the dotted lines $k\ k$, Fig. 2, the lips being closed to produce a flat stream by turning the nut forward into close contact with the arms $m$.

When the nozzle is adjusted or arranged to produce a round stream, the friction of the moving water on the surrounding atmosphere produces a current of air, which acts to open or distend the lips and keep them from contact with the stream ; but, if deemed desirable, springs for this purpose may be inserted in the hinges or joints by which the lips are connected to the body, the expansive action of the springs being overcome by the nut as it is turned to close the lips.

Having thus explained my improvement, what I claim is—

1. In a hose-pipe nozzle, the body A, provided with the nut B and jointed lips C, combined and arranged to operate substantially as specified.

2. In a hose-pipe nozzle, the jointed lips C, having the concaves $n\ n$, substantially as and for the purpose set forth.

LYMAN B. SMITH.

Witnesses:
JOSEPH B. BRAMAN,
WILLIAM H. DIEHL.